JOHN H. CHEEVER, OF NEW YORK, N. Y.

Letters Patent No. 87,467, dated March 2, 1869.

IMPROVEMENT IN THE MANUFACTURE OF INDIA-RUBBER TRUNKS, VALISES, BOXES, &c.

The Schedule referred to in these Letters Patent and making part of the same.

*To whom it may concern:*

Be it known that I, JOHN H. CHEEVER, of the city, county, and State of New York, have invented certain new and useful Improvements in Vulcanized India-Rubber Trunks, Valises, &c., and method of making the same; and I hereby declare the following to be a full, clear, and exact description thereof.

It is well known that ordinary trunks and valises, however well made, and tightly put together, are not water-proof, become damaged in comparatively a short time, by reason of the hard usage to which they are subjected, their seams and joints open, their whole frame is loosened and shaken, and they are thus soon unfitted for use.

The object I have in view is to produce an article of this kind, which, while equalling in appearance those made of leather, or other material usually employed, will exceed them in durability, will be permanently water-proof, and will possess a certain elasticity which will enable it to better resist sudden blows or jars. To this end, My invention may be stated to consist, First, of a trunk made of India rubber, combined with fibre, or with *papier-maché*, or the equivalent of the same, substantially in the manner hereinafter described, that is to say, when the whole of the trunk, or the sections thereof, are shaped and vulcanized in moulds.

Second, in the production of trunk-sections or parts, composed of India rubber and fibrous matter, or *papier-maché*, or its equivalent, shaped and vulcanized in moulds, in such manner as that said parts may be readily united by any mechanical means, to form a trunk or valise.

The use of *papier-maché*, or its equivalent, will give a cheap, strong, and compact body for the trunk, and I will therefore proceed to describe my invention as applied to a trunk-body of this kind, it being understood that other suitable materials may be substituted for the *papier-maché*, if desired, or that the trunk-body may be formed wholly of rubber, mixed or adulterated with fibrous matter, in sufficient quantity to give it, when vulcanized, the required stiffness.

One mode of procedure is to construct the body or frame-work of the trunk or valise of *papier-maché*, in any ordinary or suitable manner, and of the desired shape and proportions.

This body is varnished with a thin coating of cement, made of India rubber dissolved in either of its solvents, for the purpose of insuring a thorough adhesion of the rubber sheet to the *papier-maché*.

The sheet of prepared rubber, colored by pigments, to give the desired color, is next placed over the cement coating, and firmly rolled by means of hand-rollers, so as to form a smooth and uniform covering.

The whole is then placed in a cast-iron or other suitable mould, having engraved within it the ornamental devices which are to appear on the outside of the trunk.

Within the paper form or frame are placed smooth metal or wood pieces, shaped so as to press against every part of the paper, and these pieces are wedged by cross-bars, which are forced between the pieces, so as to firmly and uniformly press the rubber covering into the engraved portions of the mould.

The iron mould is then placed under a press, and brought together and strapped. It is next placed in the vulcanizing-chamber, and the rubber is vulcanized, and is then taken from there heated, and opened, after being allowed to cool.

The next step is to add the iron straps to the trunk, if such are required, in the manner usually practised by makers of leather trunks, to line the trunk with cloth, and add such straps and other appendages as required, in any of the modes now adopted for such purposes.

A very good trunk or valise can be made by preparing slabs of *papier-maché*, or very strong and firm paper-board, and making a frame of this, by cementing a strong paper-parchment over the edgings to join them, and then proceeding as above specified.

A third mode is to form the lid or cover, and the lower part of the trunk separately, or the top, bottom, and sides separately, by pressing the *papier-maché*, or other material employed, in moulds of the desired form, covering the side designed for the exterior of the trunk with India rubber, as above described, and vulcanizing the different sections in as many different moulds.

Then these sections are joined together by strong rivets, or sewed with wire, or united by other mechanical means, and the trunk thus formed is trimmed and finished, as already described.

An advantage realized by this method is, that these sections, moulded and vulcanized, can be made at the rubber-manufactory in large quantities, and then shipped or transported with little expense, as they can be packed in a small space.

Arriving at their destination, they are all prepared, without the need of cutting or trimming, to be fitted and united together, which can be done by any trunk-maker or manufacturer.

As hereinbefore stated, instead of making the trunk of rubber combined with *papier-maché*, or similar material, it may be made of rubber alone, mixed, in the usual manner, with fibrous matter, to give it the required stiffness, and then vulcanized, in sections or not, as preferred, in the manner hereinbefore described.

Having now described my invention, and the manner in which the same is or may be carried into effect,

What I claim, and desire to secure by Letters Patent, is as follows:

1. I claim a trunk or valise, made of India rubber, combined with fibrous matter, or with *papier-maché*, or the equivalent of the same, substantially in the manner herein described, that is to say, when the whole of the trunk, or the sections thereof, are shaped and vulcanized in moulds.

2. I claim, as a new manufacture, the production of trunk-sections, or parts, composed of India rubber and fibrous matter, or *papier-maché*, or its equivalent, shaped and vulcanized in moulds, in such manner that said parts may be readily united by any mechanical means, to form a trunk or valise, substantially as set forth.

In testimony whereof, I have signed my name to this specification, before two subscribing witnesses.

JOHN H. CHEEVER.

Witnesses:
LAWRENCE A. SNEDEN,
JOHN L. COBB.